US008022663B2

(12) United States Patent
Davis et al.

(10) Patent No.: US 8,022,663 B2
(45) Date of Patent: Sep. 20, 2011

(54) ENERGY RECAPTURE FOR AN INDUSTRIAL VEHICLE

(75) Inventors: James W. Davis, Winterville, NC (US); Kevin J. McGoldrick, Greenville, NC (US); Alan H. Fitzsimmons, Greenville, NC (US); Robert M. Neil, Winterville, NC (US); John Rowley, Tigard, OR (US)

(73) Assignee: NMHG Oregon, LLC, Fairview, OR (US)

( * ) Notice: Subject to any disclaimer, the term of this patent is extended or adjusted under 35 U.S.C. 154(b) by 626 days.

(21) Appl. No.: 12/124,963

(22) Filed: May 21, 2008

(65) Prior Publication Data

US 2008/0290842 A1 Nov. 27, 2008

Related U.S. Application Data (60) Provisional application No. 60/939,336, filed on May 21, 2007.

(51) Int. Cl.
  *H02J 7/14* (2006.01)
  *H02J 7/00* (2006.01)
  *H02J 7/04* (2006.01)
  *H02J 7/16* (2006.01)
  *H02J 7/24* (2006.01)

(52) U.S. Cl. ........ 320/104; 320/128; 320/152; 320/157; 320/159

(58) Field of Classification Search .................. 320/104
  See application file for complete search history.

(56) References Cited

U.S. PATENT DOCUMENTS

| 3,947,744 | A | * | 3/1976 | Grace et al. ................ 320/128 |
| 5,218,897 | A | | 6/1993 | Shirai |
| 5,773,969 | A | | 6/1998 | Nakayama et al. |
| 5,913,932 | A | | 6/1999 | Takayama |
| 6,131,692 | A | | 10/2000 | Kawasuji |
| 6,164,327 | A | | 12/2000 | Yoshida |
| 6,186,172 | B1 | | 2/2001 | Yoshida |
| 6,236,122 | B1 | | 5/2001 | Maeda et al. |
| 6,237,479 | B1 | | 5/2001 | Douba |
| 6,336,518 | B1 | | 1/2002 | Matsuyama |
| 6,460,332 | B1 | | 10/2002 | Maruta et al. |
| 6,480,769 | B1 | | 11/2002 | Kageyama |
| 6,534,950 | B2 | | 3/2003 | LeBoe |

(Continued)

FOREIGN PATENT DOCUMENTS

DE 10319203 11/2004

(Continued)

OTHER PUBLICATIONS

European Patent Office, International Search Report and Written Opinion for PCT/US2008/064411, Dec. 22, 2009.

*Primary Examiner* — Edward Tso
*Assistant Examiner* — Ahmed Omar
(74) *Attorney, Agent, or Firm* — Stolowitz Ford Cowger LLP (57) ABSTRACT

A system for capturing regenerative energy includes a battery configured to provide power for a traction motor and other operations of a vehicle and a capacitor connected to the battery. An auxiliary motor is configured to operate as a generator during a regenerative energy operation. The system further includes a controller configured to direct the regenerative energy to the capacitor during the regenerative energy operation and discharge the capacitor to provide power to the traction motor or for the other operations of the vehicle.

30 Claims, 7 Drawing Sheets

U.S. PATENT DOCUMENTS

| | | | |
|---|---|---|---|
| 6,559,621 B2 | 5/2003 | Corless et al. | |
| 6,616,424 B2 | 9/2003 | Raiser | |
| 6,678,972 B2 | 1/2004 | Naruse et al. | |
| 6,705,030 B2 | 3/2004 | Tokunaga | |
| 6,708,787 B2 | 3/2004 | Naruse et al. | |
| 6,912,849 B2 | 7/2005 | Inoue et al. | |
| 6,922,989 B2 | 8/2005 | Nagura et al. | |
| 6,922,990 B2 | 8/2005 | Narusa et al. | |
| 6,962,050 B2 | 11/2005 | Hiraki et al. | |
| 7,086,226 B2 | 8/2006 | Oguri et al. | |
| 7,186,473 B2 * | 3/2007 | Shiue et al. | 429/7 |
| 7,423,391 B2 | 9/2008 | Oyobe et al. | |
| 2002/0109407 A1 * | 8/2002 | Morimoto et al. | 307/10.1 |
| 2002/0158513 A1 * | 10/2002 | Amano et al. | 307/10.6 |
| 2003/0118876 A1 | 6/2003 | Sugiura et al. | |
| 2004/0053082 A1 | 3/2004 | McCluskey et al. | |
| 2004/0159480 A1 | 8/2004 | Ishikawa et al. | |
| 2004/0172206 A1 | 9/2004 | Saeki et al. | |
| 2005/0110453 A1 | 5/2005 | Lecky | |
| 2005/0139399 A1 | 6/2005 | Gopal | |
| 2006/0029846 A1 | 2/2006 | Konoto et al. | |
| 2006/0061922 A1 | 3/2006 | Mihai et al. | |
| 2006/0078773 A1 | 4/2006 | Speranza et al. | |
| 2006/0127704 A1 | 6/2006 | Raiser | |
| 2007/0090808 A1 | 4/2007 | McCabe et al. | |

FOREIGN PATENT DOCUMENTS

| | | | |
|---|---|---|---|
| DE | 10322863 | | 12/2004 |
| DE | 102004032197 | | 2/2005 |
| JP | 2003143713 | | 5/2003 |
| JP | 2003219566 | | 7/2003 |
| JP | 2003230204 | | 8/2003 |
| JP | 2004100621 | | 4/2004 |
| JP | 2006087163 A | * | 3/2006 |
| JP | 2006245630 | | 9/2006 |
| JP | 2006314172 | | 11/2006 |
| JP | 2007020368 | | 1/2007 |
| JP | 2007218111 | | 8/2007 |
| JP | 2007282359 | | 10/2007 |

* cited by examiner

ENERGY RECAPTURE FOR AN INDUSTRIAL VEHICLE

This application claims priority to U.S. Provisional Application 60/939,336 filed on May 21, 2007, which is herein incorporated by reference in its entirety.

BACKGROUND

Electric vehicles typically utilize an electric motor to provide for traction that provides horizontal movement of the vehicle. Batteries installed on the electric vehicle provide the electric motor with a source of electrical energy. The electric vehicle and associated motor or motors may be configured to operate using either an AC (alternating current) or DC (direct current) electrical system. A rate of energy discharge from the battery during operation of the vehicle depends on a number of conditions including vehicle travel speed, weight of load being transported, efficiency of the electrical system, and even operating temperatures, among others.

The overall productivity of an electric vehicle is limited by an amount of energy that is stored in the vehicle battery. Where the electric vehicle is operated for extended or multiple shifts, the battery typically needs to be recharged or replaced one or more times. This results in lost productivity time, and requires that charged replacement batteries are stocked and made available. Manufacturers of these vehicles have typically responded to these demands by increasing the size, and hence capacity, of these batteries. However, the increased size of the battery reduces vehicle performance and effective operating time due to the increased weight, and adds cost to the battery and vehicle purchase price. Furthermore, many vehicle operations place a premium on vehicle operating space, such that any increase in battery size is limited by the maximum allowable battery compartment space available.

With the advent of regenerative traction systems, electric vehicle manufacturers have designed electrical systems that are configured to regenerate electricity when the vehicle is decelerated or braked. The battery is partially recharged with regenerated energy that is delivered by the electric motor and a power circuit. In this case, the electric motor may operate as a generator to generate the regenerated electricity.

Typically, these regenerative braking systems include a lead acid battery. However, there are limits inherent in the chemical processes involved in charging a lead acid battery. As a result, a lead acid battery cannot change from discharging to recharging fast enough and accept a high enough rate of recharge to recover a high percentage of regenerative energy. Using the motor as a generator results in bursts of energy that tend to exceed the rate at which the battery may be recharged effectively. Further, the ability of a lead acid battery to absorb energy is inversely proportional to its state of charge. That is to say, the greater the existing charge on the battery, the lower the rate at which it can accept incoming energy during the recharging event. A nearly fully charged battery, such as at the beginning of a shift, is particularly inefficient at absorbing the incoming energy during regenerative braking. Energy not recaptured by charging the battery is dissipated as heat.

The present invention addresses these and other problems.

SUMMARY OF THE INVENTION

An example embodiment of an energy recapture system is disclosed as comprising a capacitor and a battery connected to the capacitor in parallel. The energy recapture system further comprises a controller configured to monitor a state of charge of the capacitor and dynamically disconnect the battery during a regenerative energy transfer event of a vehicle. The battery is reconnected after the transferred energy has been stored and ultimately consumed.

A further example embodiment of a system for capturing regenerative energy is disclosed as comprising a battery configured to provide power for a traction motor or traction motors, a lift motor, and other operations of a vehicle. A capacitor is connected to the battery and a motor or motors are configured to operate as a generator or generators during a regenerative energy operation. A controller is configured to direct the regenerative energy to the capacitor, by disconnecting the battery during the regenerative energy operation. The controller is further configured to monitor the power level in the capacitor and reconnect the battery when the capacitor has been sufficiently discharged.

In one embodiment, a regenerative power module comprises a housing, a capacitor configured to store regenerative power, and a battery connected to the capacitor in parallel. The battery and the capacitor are located within the housing. A first external connector of the housing is configured to transmit regenerative power to the capacitor and the battery. A second external connector of the housing is configured to transmit power to a vehicle electrical circuit.

The foregoing and other objects, features and advantages of the invention will become more readily apparent from the following detailed description of a preferred embodiment of the invention which proceeds with reference to the accompanying drawings.

DETAILED DESCRIPTION

Figure 1:
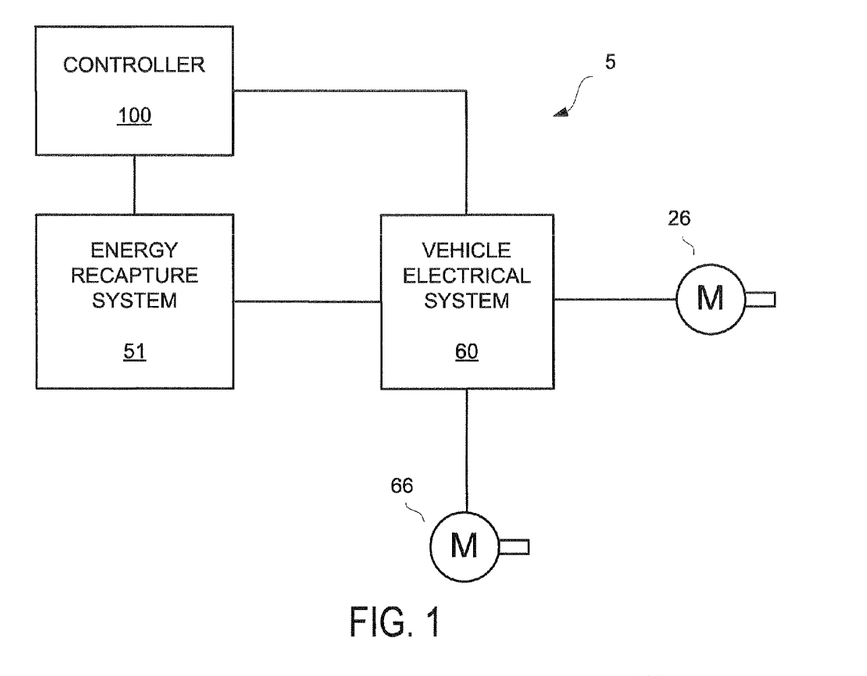
FIG. 1 illustrates a simplified block diagram of an industrial vehicle comprising an energy recapture system.

FIG. 1 illustrates a simplified block diagram of an industrial vehicle 5 comprising a vehicle electrical system 60 and an energy recapture system 51. The vehicle electrical system 60 is shown as including or being operatively connected to one or more electrical motors 26, 66. The one or more motors may provide power for a variety of vehicle operations, and may include a hoist motor 26, a traction motor 66, or an auxiliary motor (not shown). The one or more motors 26, 66 may operate as electrical generators during an energy recapture event, such that electricity generated by the one or more motors 26, 66 may be supplied to and stored in the energy recapture system 51.

Energy provided by the one or more motors 26, 66 or by the energy recapture system 51 may be used for a number of different vehicle operations or functions. For example, energy requests or demands may be made for one or more of the following: vehicle traction, hoist, lighting, horn, backup alarm, operator compartment heating, instrumentation and processing, among others. A controller 100 may be configured to provide instructions for operation of the energy recapture system 51, as to when and how the energy will be provided to the vehicle electrical system 60, as well as to control and monitor the energy that is received by the one or more motors 26, 66.

The controller 100 may be an onboard processor, such as part of a vehicle management system, or a separate processor dedicated to the energy recapture system 51. In one embodiment, separate controllers are provided for the energy recapture system 51, vehicle electrical system 60 and the one or more motors 26, 66.

The traction motor 66 may be configured to operate as a generator when the vehicle 5 is decelerated. Accordingly, traction motor 66 may provide regenerative energy to the energy recapture system 51 via the vehicle electrical system 60 during a regenerative braking event. Similarly, the hoist motor 26 may be configured to operate as a generator when a load is being lowered. Hoist motor 26 may provide regenerative energy to the energy recapture system 51 via the vehicle electrical system 60 during a regenerative lowering event. The vehicle electrical system 60 may be configured to control the one or more motors 26, 66 during normal operation of the vehicle 5, including any regenerative energy operations or events.

A motor that is normally used for motive or hydraulic power may be configured as a generator. The motor may be back-driven to generate electricity. In the case of traction, a magnetic field opposite to the direction of travel is applied to the motor during braking. The kinetic energy of the moving vehicle causes the traction motor to rotate within this magnetic field resulting in a voltage and electrical current being produced. In the case of hoist, a magnetic field opposite to the rotation of the pump and associated motor when the load is lowered is applied to the hoist motor during lowering. The flow of hydraulic fluid causes the hydraulic motor to rotate within this magnetic field resulting in a voltage and electrical current being produced.

Figure 2A:
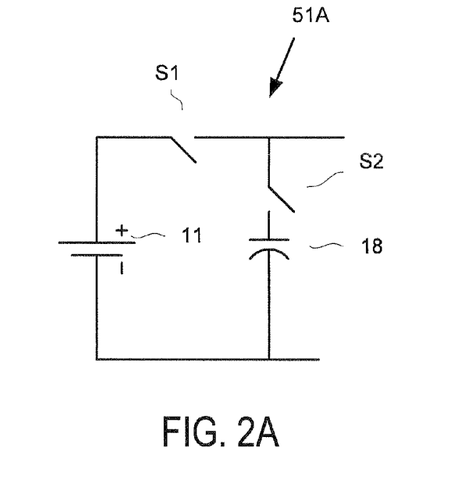
FIG. 2A illustrates a simplified schematic diagram of an example energy recapture system comprising a battery and a capacitor.

FIG. 2A illustrates a simplified schematic diagram of an example energy recapture system 51A comprising a battery 11 and a capacitor 18. The battery 11 and the capacitor 18 are illustrated as being connected in parallel in the present embodiment. The battery 11 may be an electric vehicle battery, such as a deep cycle lead acid battery. In other embodiments, the battery 11 may utilize nickel metal hydride, lithium ion, hydrogen fuel cell, or other suitable technologies. The battery 11 may be referred to variously herein as a primary power source, whereas the capacitor 18 may be referred to as a secondary power source. A battery may be understood as having a higher energy storage capacity than a capacitor.

In one embodiment the capacitor 18 is a high capacity super-capacitor or ultra-capacitor. The capacitor 18 may comprise an electrochemical double layer of capacitive material that has a far higher energy density as compared to conventional electrolytic capacitors. In some cases, the difference in energy density can be on the order of several thousand times greater. The relatively large surface area of the electrochemical double layers coupled with a small dielectric thickness provides for the high capacity of the ultra-capacitor. The capacitor 18 may be understood as allowing for higher rates of charging as compared to a battery. In some embodiments, the capacitor may provide for a higher rate of discharge as compared to a battery.

Capacitors tend to be much better than batteries at absorbing energy. For example, where there is no chemical process involved in charging a capacitor, the capacitor can accept a charge much more rapidly than a lead acid battery. One measure in determining a power source's ability to rapidly accept and deliver a charge is termed Equivalent Series Resistance (ESR). The higher the ESR, the more energy that is lost during charging and discharging of the associated power source. It is understood that the ESR of the capacitor is significantly lower than that of the battery. A system for capturing regenerative energy comprising a capacitor yields higher system voltages than those associated with lead acid batteries alone. This is a result of the fact that the capacitor is allowed to charge to levels greater than that of the lead acid battery.

One or more switches S1 and S2 may be provided to switch in (activate) or switch out either of the battery 11 or capacitor 18 during operation of the vehicle 5. For example, switch S1 may operate to switch in or switch out the battery 11, whereas switch S2 may operate to switch in or switch out the capacitor 18. The one or more switches S1, S2 may comprise contactors, solid state devices or other types of switching devices. Contactors typically comprise high current electro-mechanical switching devices that provide a high current carrying capacity. Solid state switching devices may include Insulated Gate Bipolar Transistors (IGBTs), or Metal Oxide Semiconductor Field Effect Transistors (MOSFETs).

The capacitor 18 may be used in conjunction with the battery 11. The battery 11 may be rechargeable. The capacitor 18 may provide a higher level of power when lifting a load or accelerating the vehicle 5 than the battery would. The capacitor 18 may provide power separately from or concurrently with the battery 11 in meeting the power demands of the vehicle 5. In one embodiment, the capacitor 18 is configured to recover regenerative energy when a load is lowered or when the vehicle 5 is being decelerated.

One or more capacitors, such as capacitor 18, may be placed in parallel with the battery 11. In some embodiments, no switching between the battery 11 and one or more capacitors is provided for. Other embodiments provide for one or more contactors or switches, such as switches S1, S2 to control the charging and discharging of the battery 11 and capacitor 18.

During a regenerative energy event, energy may be delivered to one or both of the battery 11 and the capacitor 18. In one embodiment, the regenerative energy is simultaneously provided to the battery 11 and the capacitor 18. Because the battery internal resistance is typically higher than the capacitor resistance, a higher percentage of the generated electrical energy is delivered to the capacitor 18 as compared to the battery 11.

When a subsequent power draw or power demand is identified, energy may be predominately withdrawn from the capacitor 18. The initial supply of power from the capacitor 18 may then diminish to be replaced by power from the battery 11. The capacitor voltage may be measured or monitored during the power draw. In one embodiment, when the capacitor voltage drops below the battery voltage the battery 11 is switched in parallel with the capacitor 18 and maintains the voltage level delivered to the vehicle electrical system 60.

The amount of energy recovered by recharging a battery is typically only a fraction of the energy that is generated from the regenerative energy event. The addition of a capacitor, such as capacitor 18, improves the energy recovery and extends the battery shift life and battery life.

A controller, such as controller 100 of FIG. 1, may be configured to monitor a state of charge of the capacitor 18 and the battery 11 during a regenerative energy transfer event of a vehicle, such as vehicle 5 of FIG. 1. In order to optimize the total energy efficiency of the vehicle 5, the controller 100 can be used to switch the battery 11 in and out of the energy recapture system 51 so as to maximize the transfer of energy between the capacitor 18 and one or more motors 26, 66. By dynamically switching the battery 11 in and out of the energy recapture system 51, the ability to capture and store electrical energy from a regenerative energy transfer event can be improved. For example, by switching the battery 11 out of the energy recapture system 51, energy may be withdrawn from the capacitor 18 at a voltage above the battery voltage and energy may be added to the capacitor 18 to a voltage above the battery voltage.

Sizing of the capacitor 18 may be accomplished as a function of the available regenerative energy for a given vehicle operation. Take as an example wherein the regenerative energy event comprises the lowering of the load of a fork lift truck. In order to be able to recapture all the regenerated energy, the capacitor 18 may be sized so as to be able to recapture the maximum amount of regenerated energy from a full or maximum allowable load of the vehicle 5 when lowered from full lift height.

Figure 2B:
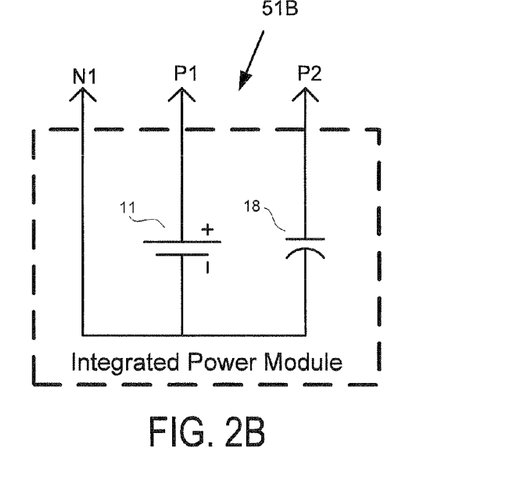
FIG. 2B illustrates an integrated power module configured to store regenerative energy.

FIG. 2B illustrates an integrated power module 51B configured to store regenerative energy. The integrated power module 51B may include a battery 11 and one or more capacitors 18. The integrated power module 51B is shown as comprising three power terminals. Power terminal N1 is a shared minus or negative terminal for the battery 11 and one or more capacitors 18. Power terminal P1 is a positive terminal for charging the battery 11 and delivering power to the vehicle electrical system 60. Power terminal P2 is a positive terminal for recharging the capacitor 18 and delivering power to the vehicle electrical system 60. Power terminals P1 and P2 may be configured to receive power from a battery charger 200. Power terminals P1 and P2 may also be configured to receive regenerated energy from the vehicle electrical system 60. In other embodiments, the battery 11 and one or more capacitors 18 are provided as separate components of the vehicle 5, such that the battery 11 could be removed for charging or replacement, for example, without removing or otherwise disturbing the one or more capacitors 18.

Figure 3:
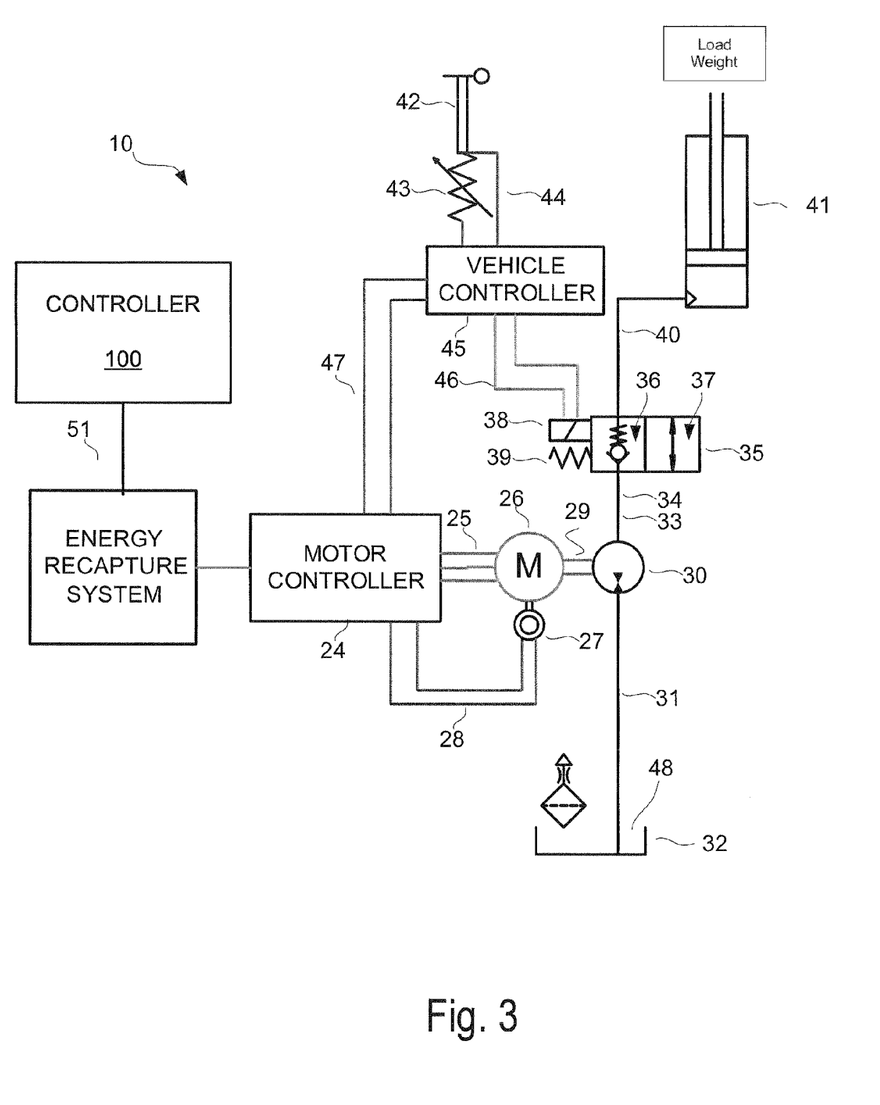
FIG. 3 illustrates an example schematic diagram of vehicle operating system configured to produce regenerative energy.

FIG. 3 illustrates an example schematic diagram of a vehicle operating system 10 configured to produce regenerative energy. The vehicle operating system 10 may be understood as comprising an electrical system and a hydraulic system. The electrical system includes a motor controller 24 configured to control energy associated with a lifting and lowering operation of a hoist motor 26 to raise or lower a load weight. Motor controller 24 is configured to command power to the hoist motor 26, causing it to operate as a motor and turn a hydraulic pump 30 to provide hydraulic pressure to lift a load weight by hydraulic cylinder 41. The motor controller 24 is further configured to reverse the direction of the hoist motor 26, causing it to operate as a generator to regenerate power during a lowering of the hydraulic cylinder 41. The regenerated power may be commanded to be sent to the energy recapture system 51. In one embodiment, the regenerated power is selectively commanded to a battery and/or a capacitor of the energy recapture system 51.

Vehicle controller 45 receives a lever position sense signal 44 from a lever position sensor 43 that is connected to an operator lift/lower speed lever 42. The vehicle controller 45 determines a motor speed command signal 47 and a lowering control signal 46 based on the lever position sense signal 44.

During a lifting operation, an operator commands the vehicle operating system 10 to lift a load by manipulating an operator lift/lower speed lever 42. Once a lowering control signal 46 is off, a return spring 39 positions a lowering control valve 35 such that hydraulic fluid 48 may only flow from the hydraulic pump 30 through a check valve section 36 in the direction of the lift cylinder 41. The motor controller 24 controls power 25 to turn the hoist motor 26. The hydraulic pump 30 is connected to the hoist motor 26 through an input/output shaft 29 providing a fluid flow 34 through hydraulic supply line 33 through a lowering control valve 35 and through the cylinder line 40 to extend the lift cylinder 41. The hydraulic pump 30 draws hydraulic fluid 48 from the hydraulic reservoir 32 through supply line 31. The resistance to fluid flow through hydraulic supply line 33 and cylinder line 40, check valve section 36 of lowering control valve 35 and the load weight combine to produce pressure in the fluid flow 34.

A positive motor speed command signal 47 causes the motor controller 24 to provide power 25 to the hoist motor 26 causing it to act as an electric motor and the hydraulic pump 30 to act as a hydraulic pump. Power is drawn from the energy recapture system 51 to power the hoist motor 26.

During a lowering operation, the operator commands the vehicle 5 operating system 10 to lower a load by once again manipulating the operator lift/lower speed lever 42. Once the lowering control signal 46 is on, a solenoid 38 shifts the straight through section 37 so that hydraulic fluid 48 may flow from the lift cylinder 41 in the direction of the hydraulic pump 30. The fluid flow 34 and pressure cause the hydraulic pump 30 to act as a hydraulic motor. The hoist motor 26 is turned by the hydraulic pump 30 through the input/output shaft 29 causing the hoist motor 26 to act as a generator. The hoist motor 26 generates electrical power 25 and sends it to the motor controller 24. The motor controller 24 rectifies the power 25 and returns electric power to the energy recapture system 51.

The lowering speed of the lift cylinder 41 is regulated by the motor controller 24 according the motor speed command signal 47 provided by the vehicle controller 45 and the motor speed sense signal 28 provided by the motor speed sensor 27. During lowering of the lift cylinder 41, the motor controller 24 may command the hoist motor 26 to act as either a motor or a generator according the difference between the motor speed sense signal 28 and the motor speed command signal 47. The use of the hoist motor 26 as a motor to assist lowering by rotating opposite the direction needed for lifting a load is referred to as powered lowering and increases lowering speed beyond that which is possible due to the load weight alone. For example a small load weight may not create enough pressure to drive a fast lowering speed. In this scenario regenerative power is not created, but previously created regenerative power may be used.

Figure 4:
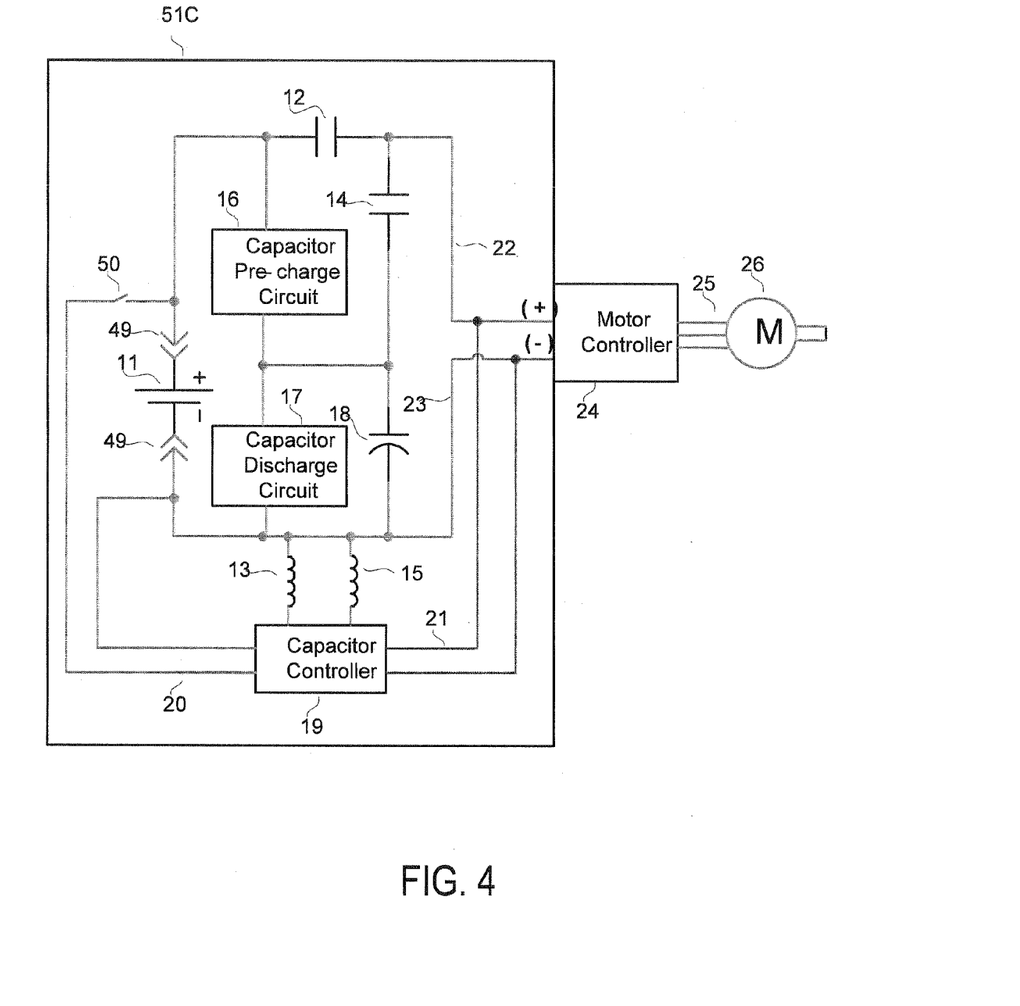
FIG. 4 illustrates an example schematic diagram of an energy recapture system.

FIG. 4 illustrates an example schematic diagram of an energy recapture system 51C in conjunction with the motor controller 24 of FIG. 3. The motor 26 is identified as being a hoist motor associated with regenerative hoist operation in one or more embodiments. Similarly, certain other components are described as operating with a regenerative hoist operation. However, it should be understood that in other embodiments the motor 26 and other components described with respect to the energy recapture system 51C may be associated with regenerative energy transfer events other than regenerative hoist, such as regenerative braking wherein motor 26 is replaced by traction motor 66.

The energy recapture system 51C comprises a battery 11 and capacitor 18 connected to a motor controller 24 through battery contactor 12, capacitor contactor 14, a supply power positive line 22, and a supply power negative line 23. The battery 11 and capacitor 18 provide power to the motor controller 24 and other auxiliary loads on the vehicle electrical system 60 (FIG. 1). Other auxiliary loads may include electronics, lighting, other electric motors, and so on. The battery 11 may be connected to or disconnected from the vehicle operating system 10 (FIG. 3) through battery contactor 12. The battery contactor 12 is closed when the battery contactor coil 13 is energized by the capacitor controller 19. Although the capacitor 18 is illustrated as a single capacitor, it is understood that one or more capacitors, or a bank of capacitors, may be provided in a circuit for other embodiments. Additionally, the battery 11 may include one or more batteries or a bank of batteries.

The capacitor 18 may be connected to or disconnected from the vehicle 5 operating system 10 through capacitor contactor 14. The capacitor contactor 14 is closed when the capacitor contactor coil 15 is energized by the capacitor controller 19. The capacitor controller 19 receives capacitor controller power 20 from the battery 11 through the key switch 50. The capacitor controller 19 energizes or de-energizes the battery contactor coil 13 and capacitor contactor coil 15 according to the supply voltage sense signal 21 and the algorithms discussed in reference to TABLE 1. The capacitor controller 19 may also dynamically change the points at which the battery contactor coil 13 and capacitor contactor coil 15 are energized or de-energized according to the battery voltage measured on the controller power 20 lines when the battery contactor 12 is open.

During the regenerative energy transfer event, the potential energy of the load weight may be converted to regenerative energy by the hoist motor 26. The hoist motor 26 is illustrated as being electrically connected to the energy recapture system 51 via the motor controller 24. A capacitor controller 19 is configured to control the dynamic switching of the current between the battery 11 and/or the capacitor 18. The motor controller 24 rectifies the power 25 and returns electric power through the supply voltage positive power line 22 to the battery 11 and/or capacitor 18. The capacitor controller 19 switches power from the battery 11 and/or capacitor 18 as it is requested by controller 100 (FIG. 1 or FIG. 3).

The battery contactor 12 is configured to switch out the battery 11. In one embodiment, the battery 11 is switched out of the circuit while the capacitor 18 is being charged. The battery 11 may otherwise limit the voltage level to which the capacitor can be charged and correspondingly limit the charge the capacitor can absorb. The capacitor contactor 14 is configured to switch out the capacitor 18. In one embodiment, the capacitor 18 is switched out of the circuit during a capacitor pre-charge event. The state of charge of the battery 11 and the capacitor 18 may be monitored according to a measured battery voltage and a measured capacitor voltage.

A capacitor pre-charge circuit 16 connects the battery 11 to the capacitor 18 by bypassing the battery contactor 12 with a current limiting device, such as a PTC (positive thermal coefficient) resistor. The capacitor pre-charge event prevents a large in-rush of current when the battery 11 and capacitor 18 are initially connected through battery contactor 12 and capacitor contactor 14.

A capacitor discharge circuit 17 may connect the capacitor 18 to the battery 11. The capacitor discharge circuit 17 automatically acts to discharge the capacitor 18 when the battery 11 is disconnected. This prevents a large residual electrical charge remaining on the capacitor 18 for a long period of time. In some embodiments the capacitor 18 may be selectively discharged for repair and maintenance of the vehicle 5.

The capacitor controller 19 may be further configured to limit the capacitor 18 to an upper threshold state of charge in order to avoid overheating of the capacitor 18 during a regenerative energy transfer event.

The capacitor 18 can be protected from potential damage due to overheating by actively monitoring the capacitor temperature. One or more sensors, not shown, may provide a temperature feedback of the capacitor 18 as well as the battery 11. In one embodiment, the capacitor 18 is switched out of the circuit and the battery 11 is switched into the circuit if the capacitor 18 temperature exceeds an allowable charging temperature threshold. The capacitor 18 may be switched out of the vehicle electrical circuit substantially simultaneously as the battery 11 is switched into the circuit.

In another embodiment, the battery 11 is simply switched into the energy recapture system 51, while the capacitor 18 also remains connected to the system. The battery 11 remains connected to the energy recapture system 51 continuously, even during energy recapture events, until the temperature of capacitor 18 returns to normal operating limits. The connected battery 11 may operate to limit an amount of energy recaptured by the capacitor 18 as well as limit a voltage of the vehicle electrical system 60.

In one embodiment, vehicle performance is adjusted to minimize the amount of energy draw or energy charge so that the capacitor 18 stays within operating limits. Both vehicle performance and current allocation may be adjusted concurrently to maintain the capacitor 18 at or below an allowable temperature threshold.

In order to avoid damage to the capacitor 18 through excessively rapid charging or discharging, a fast response high current fuse, not shown, can be added to the circuit at the output of the capacitor 18. With the battery 11 configured in parallel with the capacitor 18, an open circuit failure of the capacitor fuse would not interfere with an ability of the battery 11 to provide power to operate the vehicle 5 or to accept power from the vehicle 5.

In one embodiment, where the battery 11 is switched by battery contactor 12 and the capacitor 18 is switched by the capacitor contactor 14, if a higher than normal rate of increase in the supply voltage sense signal 21 is detected it signals a controller that the high current fuse and/or the capacitor 18 are open. A high voltage level or a high rate of voltage increase would indicate an open. Upon detection of this condition the capacitor controller 19 inhibits normal energy recapture by closing and keeping closed battery contactor 12 until the key switch 50 is turned off. Regeneration of the capacitor 18 may be automatically disabled by leaving the battery 11 connected through battery contactor 12. A higher than normal rate of increase in the supply voltage sense signal 21 may also signal a fault to an operator. The fault may be corrected by turning the key switch 50 off.

Those skilled in the art would recognize that in lieu of a PTC or resistor, the use of a buck regulator may provide a controlled pre-charge of the capacitor and thereby avoid a large in-rush of electrical current.

When the battery 11 is initially connected to the energy recapture system 51C by the battery connectors 49 the key switch 50, the battery contactor 12 and capacitor contactor 14 are all open. The capacitor pre-charge circuit 16 may begin to function immediately to pre-charge the capacitor to battery voltage. The operator then closes the key switch 50 and the battery contactor 12 may be closed immediately to energize truck electrical systems. After a short pre-determined time delay to allow the capacitor pre-charge circuit 16 to complete a capacitor pre-charge, the capacitor contactor 14 is closed.

As previously discussed, the battery 11 and capacitor 18 may be dynamically switched in and out of the circuit during a regenerative energy event. The battery 11 may be switched out of the circuit as the capacitor 18 is being charged or discharged in order to maximize an efficiency of storage and utilization of the energy by the capacitor 18. The capacitor 18 may be switched out of the circuit while it is being pre-charged. Switching between the capacitor 18 and the combination of the battery 11 and capacitor 18 may be based on one or more states of the vehicle 5 as well as the battery voltage and capacitor voltage.

TABLE 1 identifies example vehicle states and corresponding switching conditions of the battery 11 and capacitor 18.

TABLE 1

| State | Description | Battery Connector 49 | Battery Contactor 12 | Capacitor Contactor 14 |
|---|---|---|---|---|
| 1 | Prior to battery install | Disconnected | Open | Open |
| 2 | Upon battery install | Connected | Open | Open |
| 3 | Normal vehicle operation | Connected | Closed | Closed |
| 4 | Regenerative Energy Event | Connected | Open | Closed |
| 5 | Regeneration continues, with battery connected | Connected | Closed | Closed |
| 6 | Vehicle operation using recaptured energy | Connected | Open | Closed |
| 7 | Resume normal vehicle operation | Connected | Closed | Closed |

State 1. The discharge circuit has discharged the capacitor to a charge state of zero. Battery is at a charge state of B+.

State 1 illustrates the vehicle state prior to vehicle startup, where the battery 11 is disconnected. Contactors or switches for the battery 11 and the capacitor 18 are indicated as being open. The battery 11 may be installed and already charged. If the capacitor 18 is discharged, a voltage of the capacitor at state 1 is zero.

State 2. The pre-charge circuit charges the capacitor to charge state of B+.

State 2 illustrates the vehicle state upon connecting the battery 11. Both contactors remain open while the capacitor 18 is being pre-charged. When the battery 11 is first connected, a pre-charge circuit may be used to charge the capacitor 18 from the battery 11 to a pre-charge voltage of B+. In some embodiments, the battery contactor 12 is closed immediately upon closure of the key switch 50. This enable the components of the vehicle electrical system 60 to be energized immediately, while the capacitor 18 is pre-charging.

The battery 11 may be positioned in parallel with the capacitor 18. The battery 11 is shown as remaining connected by the battery connectors 49 throughout States 2 through 7.

State 3. The vehicle 5 operates normally, drawing power from the battery and the capacitor.

State 3 illustrates the vehicle state during normal vehicle operation. The battery contactor and the capacitor contactor are identified as being closed. Normal vehicle operation begins and continues until such time as a regenerative energy event is detected at State 4.

State 4. When supply voltage sense signal 21 voltage reaches a value that is equal to or greater than a "begin energy recapture" voltage threshold, the battery is switched out and energy is recaptured by the capacitor. This continues until supply voltage reaches a higher value that is equal or greater than a "capacitor charge limit" voltage threshold or until the physical movement causing the regeneration stops.

State 4 illustrates the vehicle state during a regenerative energy event. When the regenerative energy event is detected, the battery 11 may be switched out (e.g. the battery contactor is opened) leaving the capacitor 18 to absorb the energy generated by the regenerative energy event. This causes the voltage on the capacitor 18 to rise or increase. This continues until supply voltage sense signal 21 voltage reaches a higher value that is equal or greater than an "capacitor charge limit" voltage threshold (Transition to State 5) or until the physical movement causing the regeneration stops.

State 5. When supply voltage sense signal 21 voltage reaches a value that is equal to or greater than a "capacitor charge limit" voltage threshold, the battery is reconnected to limit the vehicle electrical system 60 voltage. This protects the capacitor from overcharging damage.

State 5 illustrates the part of a regeneration event, where the voltage on the capacitor 18 reaches a predetermined limit or capacity threshold. This limit may also be known as the "end energy recapture" voltage threshold. In one embodiment the battery 11 is switched in to the energy recapture system 51 to limit the rise in the vehicle electrical system 60 voltage.

If the supply voltage sense signal 21 voltage does not reach the "capacitor charge limit," during state 4 or if the capacitor temperature is below a set limit, then operation will bypass state 5 and pass directly from state 4 to state 6.

State 6. Truck functions that require power draw it from the capacitor 18. The truck operates normally, drawing power from the capacitor 18.

State 6 illustrates the vehicle state of operating on recaptured or regenerated energy. As long as the capacitor 18 is charged above B+voltage, the battery 11 may remain switched out of the circuit. This state continues until the capacitor 18 reaches or drops below a minimum capacity threshold. This minimum capacity threshold may also be known as the "end capacitor discharge" voltage threshold. The minimum capacity threshold may include the pre-charge voltage or the pre-charge voltage minus a predetermined value. During state 6, the vehicle 5 may operate exclusively using energy recaptured from the regenerative energy event. Normal vehicle operation and the power demands associated therewith cause the capacitor 18 to discharge until it reaches or drops below the minimum capacity threshold also known as the "end capacitor discharge" voltage threshold.

State 7. When supply voltage sense signal 21 voltage drops to or below the end capacitor discharge voltage threshold, the battery contactor 12 is closed. The voltages between the battery 11 and capacitor 18 are nearly the same value and any difference rapidly equalizes.

State 7 illustrates the vehicle state of resuming normal vehicle operation. When the capacitor 18 is discharged at or below the minimum capacity threshold, or end capacitor discharge voltage threshold, the battery 11 is switched back into the circuit. In some embodiments, the capacitor 18 is charged back up to the pre-charged state or condition in preparation for a subsequent regenerative energy event. In one embodiment, State 7 and State 3 are equivalent states, wherein operation loops back to State 3 after State 6.

In one embodiment the minimum capacity threshold or end capacitor discharge voltage threshold is adjusted downward as the battery energy declines from use. This allows more of the regenerated energy to be used before switching the battery 11 back into the circuit.

Figure 5:
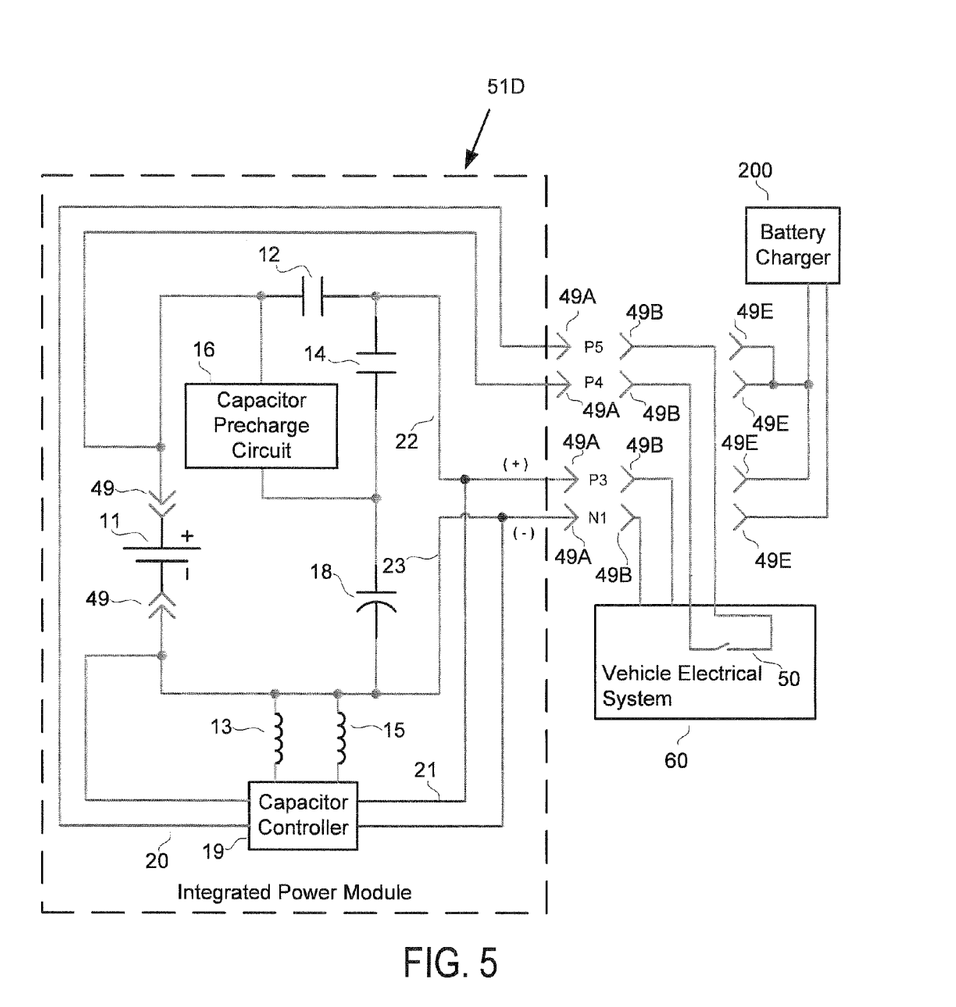
FIG. 5 illustrates an integrated power module configured to control and store regenerative energy.

FIG. 5 illustrates an embodiment of an integrated power module 51D that may be disconnected from the vehicle electrical system 60 to be recharged by a battery charger 200. The integrated power module 51D includes all of the components necessary to provide an energy recapture system 51 in a package that can replace a conventional battery and can be used on an existing battery powered vehicle without modification of the battery powered vehicle or the battery compartment.

The integrated power module 51D is connected to the vehicle electrical system 60 by terminal P3 (switched battery positive) and N1 (battery negative) through battery connector 49A and truck connector 49B. Terminal P3 may be used to receive regenerated energy from the vehicle electrical system 60 for storage on one or both of the capacitor 18 and the battery 11. Terminal P3 may also be used to transmit energy stored by the capacitor 18 and the battery 11 to the vehicle electrical system 60. The integrated power module 51D may also be connected to a battery charger 200 by terminal P3 and terminal N1 through battery connector 49A and battery charger connector 49E. Terminal P3 may therefore be additionally used to receive power from the battery charger 200 for storage on one or both of the battery 11 and the capacitor 18. A capacitor controller 19 is designed to withstand the high voltages and currents associated with the battery 11 and the battery charger 200.

Figure 6:
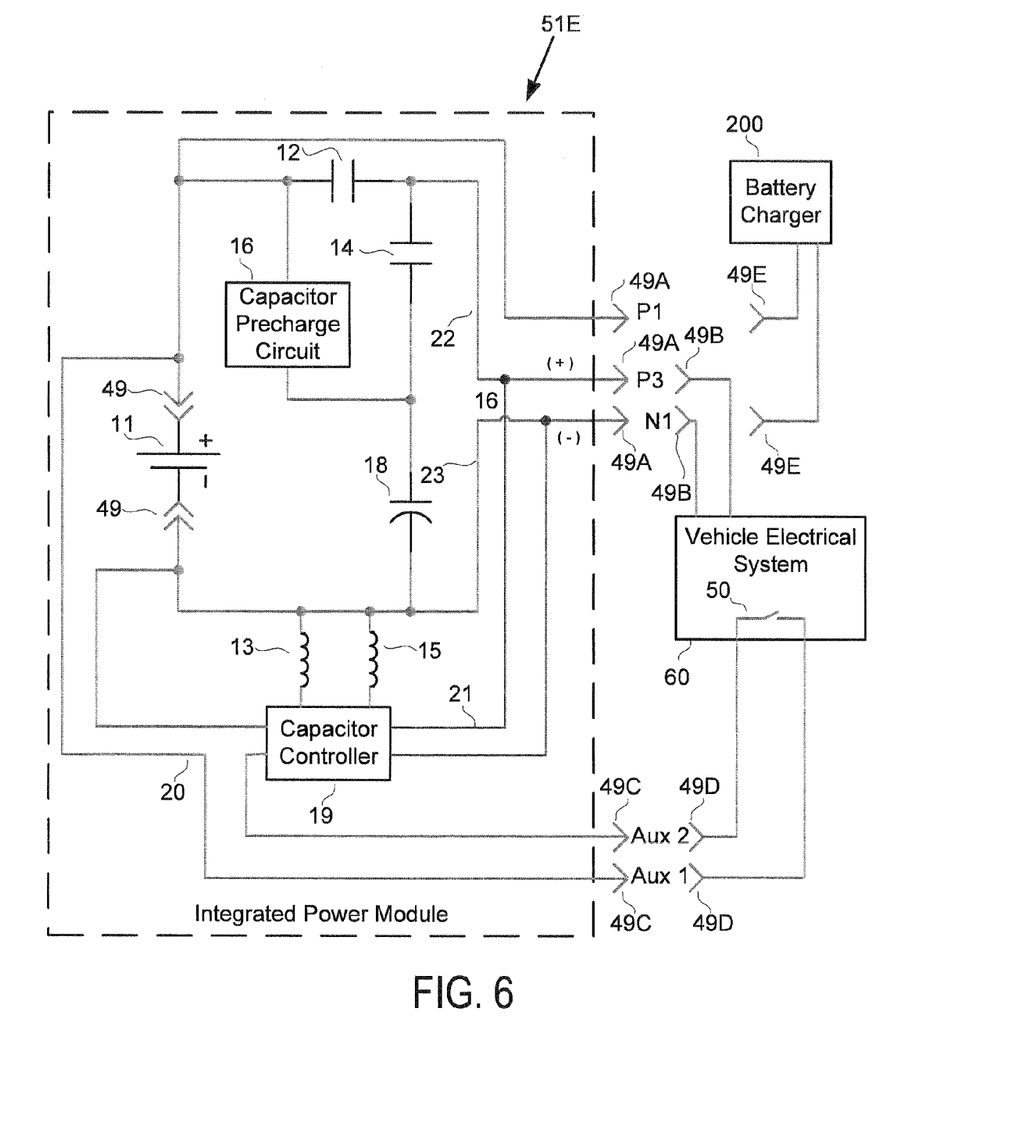
FIG. 6 illustrates an integrated power module comprising an external key switch.

FIG. 6 illustrates another embodiment of an integrated power module 51E that is connected to the key switch 50 by terminal Aux 1 (capacitor controller power 20) and terminal Aux 2 through connectors 49C and 49D. This prevents the capacitor controller 19 from drawing capacitor controller power 20 from the battery 11, when the integrated power module 51E is not connected to the vehicle electrical system 60.

When the integrated power module 51E is not connected through terminal P3 (switched battery positive) and terminal N1 (battery negative) by connectors 49A and 49B, the battery contactor 12 is normally open. Terminal P3 may be used to receive regenerated energy from the vehicle electrical system 60 for storage on one or both of the capacitor 18 and the battery 11. Terminal P3 may also be used to transmit energy stored by the capacitor 18 and the battery 11 to the vehicle electrical system 60 To enable battery charging a battery charger 200 may be connected to terminal P1 (battery positive) and terminal N1 (battery negative) by connectors 49A and 49E to transmit power to the battery 11. This connection bypasses the normally open battery contactor 12 during battery recharging, so that the battery 11 may be charged even when the battery contactor 12 is open.

One embodiment of the integrated power module 51E includes all connectors 49A and 49C in one connector housing. One embodiment of the vehicle electrical system 60 includes all connectors 49B and 49D in one connector housing. The vehicle electrical system 60 also includes the key switch 50.

In some embodiments, the integrated power module 51D or 51E further comprises the capacitor discharge circuit 17 of FIG. 4. Other embodiments do not include the capacitor discharge circuit 17. By not including the capacitor discharge circuit 17, a continuous drain on the battery 11 may be prevented after the integrated power module 51D or 51E is disconnected from the vehicle electrical system 60 (FIG. 1). A residual charge may remain on the capacitor 18 since the battery 11 is expected to have a charge on it and is also a part of the integrated power module 51D or 51E.

Figure 7:
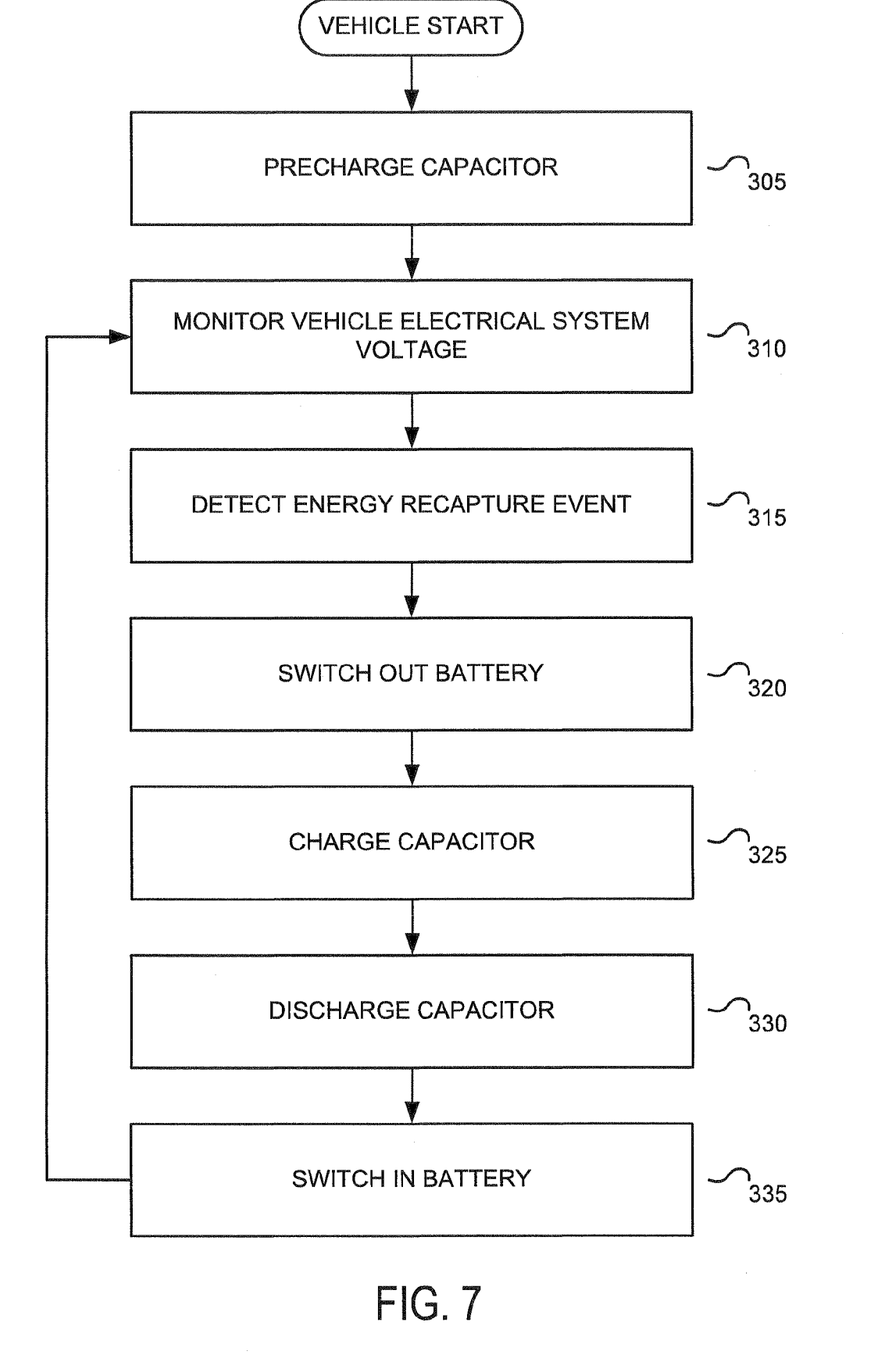
FIG. 7 illustrates an example method of operation of an energy recapture system including detection of an energy recapture event.

FIG. 7 illustrates an example method of operation of an energy recapture system, such as energy recapture system 51 of FIG. 1, including detection of an energy recapture event.

At operation 305 one or more capacitors, such as capacitor 18 of FIG. 2A, are pre-charged with a pre-charge current. The capacitor 18 may be pre-charged via a passive or active current limiting circuit. Pre-charging allows the capacitor 18 to operate more reliably by limiting in-rush current during connection to a battery 11. In one embodiment, a relatively small voltage differential is maintained between the battery 11 and the capacitor 18 as a result of pre-charging.

The capacitor 18 may initially be pre-charged after battery 11 connection into the energy recapture system 51 by battery connector 49. In some embodiments, the capacitor 18 is completely discharged upon battery 11 disconnection from the energy recapture system 51 to avoid any inadvertent discharge during storage or maintenance of the vehicle 5. Accordingly, at vehicle startup, the capacitor 18 may not have any significant charge built up to prevent high in-rush currents. In yet another embodiment such as the Integrated Power Module 51B or 51C, both the capacitor 18 and the battery 11 are charged by a battery charging station prior to vehicle startup.

At operation 310, vehicle electrical system voltage is monitored at supply voltage sense signal 21. The vehicle electrical system voltage may be continuously monitored during vehicle operation. The vehicle electrical system voltage may indicate an availability of power or remaining length of operational time in the vehicle 5.

In one embodiment, a lookup table or algorithm is used to dynamically adjust the "end of capacitor discharge" voltage threshold. A new voltage threshold may be calculated based on a battery 11 voltage. In this way when the battery 11 is partially discharged, the "end of capacitor discharge" voltage threshold may be lowered to maximize the utilization of capacitor 18.

At operation 315, an energy recapture event is detected. In one embodiment, the energy recapture event is detected according to a change in vehicle electrical system voltage, due to an influx of current to the energy recapture system 51 (see FIG. 1). An energy recapture event may also be determined by the controller by monitoring factors such as load weight or height and interpreting operator commands.

Several threshold values of vehicle electrical system 60 voltage may be useful. They range from least to greatest voltage.

A vehicle electrical system 60 voltage known as "end capacitor discharge"
=Battery volts−W volts
A vehicle electrical system 60 voltage known as "begin energy recapture"
=Battery volts+X volts
A vehicle electrical system 60 voltage known as "capacitor charge limit"
=Battery volts+X volts+Y volts
A vehicle electrical system 60 voltage known as "shutdown energy recapture"
=Battery volts+X volts+Y volts+Z volts
W, X, Y, and Z are values determined according to the application and are intended to show the relative value of the voltage thresholds in relation to one another. All values are assumed positive.

An energy recapture event is detected, when the vehicle electrical system 60 voltage sense signal 21 is greater than the begin energy recapture voltage threshold.

Battery voltage sensing is explained herein. When the key switch 50 is closed a capacitor controller power 20 is supplied from the battery 11 to the capacitor controller 19. The capacitor controller also senses battery voltage (not shown) through the capacitor controller power 20 wires at any time the battery contactor 12 is open. Battery volts (not shown) sensed through the capacitor controller power 20 wires may be used by the capacitor controller 19 to dynamically adjust the aforementioned voltage thresholds As the battery 11 discharges during use, the battery voltage progressively decreases to lower values. The capacitor controller 19 may dynamically decrease the end capacitor discharge voltage threshold to correspond to the decreasing battery voltage. This enables the capacitor 18 to recapture more regenerated energy than without dynamic adjustment increasing regeneration efficiency as the battery 11 discharges. It also reduces the potential voltage difference between the battery 11 and the capacitor 18, when the battery contactor 12 is closed when the supply voltage sense signal 21 is equal to or less than the end capacitor discharge voltage threshold. This reduction in potential voltage difference may provide a benefit by reducing battery contactor 12 tip wear for electro-mechanical contactors, for example.

At operation 320 the battery, such as battery 11 of FIG. 1, is switched out of the energy recapture system 51. Switching out the battery 11 may provide for energy transfer efficiencies wherein a higher percentage of the energy may be stored in the capacitor 18.

At operation 325, the capacitor 18 is charged with the regenerative energy. The capacitor 18 may be configured to absorb a majority of the regenerative energy associated with the energy recapture event. A certain percentage of the regenerative energy may be lost due to the ESR (Equivalent Series Resistance) of the capacitor 18.

At operation 330, the capacitor 18 is discharged to provide power to the vehicle 5 or to provide power to the electrical systems (e.g., vehicle electrical system 60, FIG. 5) associated with vehicle 5. In some embodiments, the battery 11 remains switched out while the capacitor 18 is being discharged.

At operation 335, the battery 11 is switched back in to the energy recapture system 51. The battery 11 may be switched back in when a power level of the capacitor 18 reaches a lower threshold value. In one embodiment, the lower threshold value is reached when the capacitor voltage equals the battery voltage. In another embodiment, the lower threshold value is reached when the capacitor voltage equals the pre-charge voltage. This lower threshold value may be a supply voltage known as the "end capacitor discharge" voltage threshold.

Figure 8:
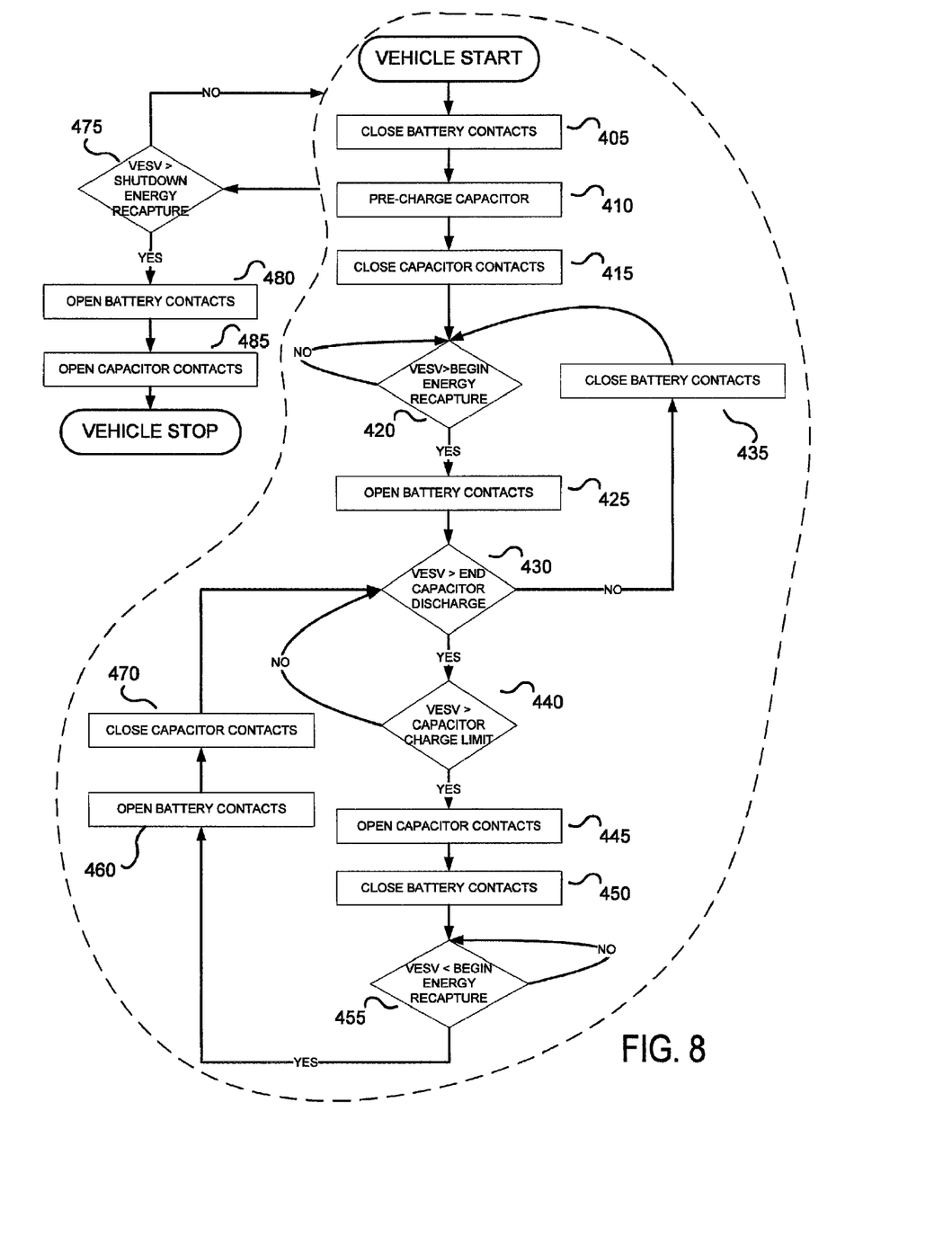
FIG. 8 illustrates an example method of operation of an energy recapture system comprising protection from overcharging.

FIG. 8 illustrates an example method of operation of an energy recapture system, such as energy recapture system 51 of FIG. 1, including detection of an energy recapture event, protection of the capacitor from over charging, and retention of the charge on the capacitor when an over charging event occurs.

At operation 405 the battery contacts 12 close immediately upon vehicle start. This provides power to the vehicle electrical system.

At operation 410 one or more capacitors, such as capacitor 18 of FIG. 2A, are pre-charged with a pre-charge current. The capacitor 18 may be pre-charged via a passive or active current limiting circuit. Pre-charging allows the capacitor 18 to operate more efficiently and more reliably by limiting in-rush current during a subsequent regenerative or energy recapture event. In one embodiment, a relatively small voltage differential is maintained between the battery 11 and the capacitor 18 as a result of pre-charging. In another embodiment capacitor 18 pre-charge begins immediately upon connection of the battery 11 into the energy recapture system 51. Then operation 410 allows a time delay to pass to ensure pre-charging is complete.

At operation 415 pre-charging of the capacitor 18 is complete and the capacitor contacts 18 are closed.

At operation 420 a vehicle electrical system voltage 21 is continuously sampled and compared to a voltage threshold known as the "begin energy recapture" voltage threshold. A vehicle electrical system voltage 21 that is higher than a battery voltage may identify the beginning of an energy recapture event.

If the vehicle electrical system voltage 21 is less than the begin energy recapture threshold, the method remains in operation 420.

If the vehicle electrical system voltage 21 is equal to or greater than the begin energy recapture voltage threshold, the method proceeds to operation 425, where the battery contacts 12 are opened and the battery 11 is switched out of the circuit and the method proceeds to operation 430. Regenerative energy is being recaptured exclusively by the capacitor 18 at this point.

At operation 430 the vehicle electrical system voltage 21 is compared to a voltage threshold known as the "end capacitor discharge" voltage threshold, which may be above or below the battery 11 voltage, but is approximately the same as the battery 11 voltage. As the voltage of the capacitor 18 becomes lower than the voltage of the battery 11, power is drawn from the battery 11.

If the vehicle electrical system voltage 21 is equal to or less than the end of capacitor discharge voltage threshold, the method proceeds to operation 435, where the battery contacts 12 are closed switching the battery 11 back into the circuit. At this point, both the battery 11 and capacitor 18 are connected to the circuit and the method proceeds back to operation 420 and repeats.

If the vehicle electrical system voltage 21 remains greater than the end of capacitor discharge voltage threshold, the method proceeds to operation 440, where an electrical system voltage 21 is compared to a voltage threshold known as the capacitor charge limit voltage threshold, which is a voltage limit for the capacitor 18. It is possible to size the capacitor 18 for the largest possible regenerative event. It is also possible to use a smaller capacitor 18 that captures most of the energy, but not all of the energy from the largest possible regenerative event. In the latter case, the capacitor 18 is switched out of the circuit and the battery 11 switched in when the capacitor charge limit voltage threshold is reached.

If the capacitor charge limit voltage threshold is not reached the method proceeds back to operation 430, otherwise the method proceeds to operation 445 where capacitor contacts 14 are opened, switching the capacitor out of the circuit and protecting it from overcharging.

Simultaneous with or immediately after opening capacitor contacts 14, the method proceeds to operation 450 where the battery contacts 12 are closed, switching the battery 11 back into the circuit to absorb regenerative power from the truck electrical system 60. The capacitor 18 is fully charged and out of the circuit, while the battery 11 continues to absorb additional regenerative energy in excess of the capacitor 18 limit.

At operation 455 the vehicle electrical system voltage is compared to the begin energy recapture voltage threshold. If the vehicle electrical system voltage drops to this threshold it indicates that the regenerative energy event is complete or nearly so, and the method proceeds to operation 460, where the battery 11 is switched out of the circuit by opening the battery contacts 12. Immediately the method proceeds to operation 470, where the fully charged capacitor 18 is switched back into the circuit by closing capacitor contacts 14 to provide power to the vehicle electrical system. The method loops back to operation 430 at this point.

At operation 475 the vehicle electrical system voltage is compared to the shut down energy recapture voltage threshold. Operation 475 may be continuously performed during one or more of the operations illustrated in FIG. 8. If the vehicle electrical system voltage does not exceed the shut down energy recapture voltage threshold, the method continues to operate as previously described.

If, on the other hand, the vehicle electrical system voltage exceeds the shut down energy recapture voltage threshold, the method proceeds to operation 480 and opens the battery contacts 12 and then proceeds to operation 485 and opens the capacitor contacts 14 switching the system power off and ending normal operations at vehicle stop.

Including one or more capacitors, such as capacitor 18, in an energy recapture system enhances the ability to maximize the amount of regenerated energy that may be stored and used on a vehicle, such as vehicle 5 of FIG. 1, whether the vehicle 5 includes regenerative hoist, regenerative braking, or any other regenerative energy operation or combination thereof.

The energy recapture system may be used with any vehicle which includes an electric motor that may also be controlled as a generator. For example, regenerative energy may be captured from a hoist system of a fork lift truck where lift is provided by a pump driven by an electrical motor. In the case of a hybrid vehicle where the hydraulic motor is electrical and motive power is provided by an internal combustion engine, the recaptured energy from regenerative hoist or vehicle deceleration may be used to power parts of successive lift operations, thereby reducing fuel consumption.

The energy recapture system for an electric vehicle provides for reduced battery power consumption and increased battery shift life. Fewer battery changes increase vehicle productivity. Because additional power is provided by the energy recapture system, a smaller battery may be used. A smaller battery may reduce the weight, size and cost of the vehicle.

The system and apparatus described above can use dedicated processor systems, micro-controllers, programmable logic devices, or microprocessors that perform some or all of the operations. Some of the operations described above may be implemented in software and other operations may be implemented in hardware. It is further understood that computer-readable medium having instructions stored thereon may be provided, wherein when the instructions are executed by at least one device, they are operable to perform some or all of the operations.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An energy recapture system comprising:
   a capacitor;
   a battery connected to the capacitor in an electrical circuit; and
   a controller configured to:
      identify a regenerative energy transfer event of a vehicle;
      switch the battery out of the electrical circuit in response to identifying the regenerative energy transfer event;
      monitor a state of charge of the capacitor during the regenerative energy transfer event, wherein the state of charge of the capacitor is compared with a capacitor charge limit; and
      switch the battery into the electrical circuit during the regenerative energy transfer event in response to the state of charge of the capacitor reaching or exceeding the capacitor charge limit.

2. The energy recapture system according to claim 1 wherein the regenerative energy transfer event comprises lowering a load, and wherein a potential energy of the load is converted to regenerative energy by a hoist motor electrically connected to the energy recapture system.

3. The energy recapture system according to claim 1 wherein the regenerative energy transfer event comprises decelerating the vehicle, and wherein a kinetic energy of the vehicle is converted to regenerative energy by a traction motor electrically connected to the energy recapture system.

4. The energy recapture system according to claim 1 wherein the battery is a lead acid battery and wherein the capacitor is a high capacity ultra-capacitor.

5. The energy recapture system according to claim 1 further comprising:
   a battery contactor configured to switch out the battery while the capacitor is being charged and discharged.

6. The energy recapture system according to claim 5 further comprising:
   a capacitor contactor configured to switch out the capacitor during a capacitor pre-charge event and a capacitor overcharge event.

7. The energy recapture system according to claim 6 wherein the capacitor pre-charge event comprises pre-charging the capacitor to a voltage approximately equal to that of the battery to avoid an excessive in-rush of power to the capacitor.

8. The energy recapture system according to claim 1 wherein the battery and the capacitor are integrated into a unitary power module comprising a single negative terminal.

9. The energy recapture system according to claim 8 wherein the unitary power module further comprises a first positive terminal connected to the capacitor and a second positive terminal connected to the battery.

10. The energy recapture system according to claim 1 wherein the state of charge is monitored according to a measured capacitor voltage.

11. A system for capturing regenerative energy comprising:
   a battery configured to provide power for a traction motor and other operations of a vehicle;
   a capacitor connected to the battery;
   an auxiliary motor configured to operate as a generator during a regenerative energy operation; and
   a controller configured to:
      direct the regenerative energy to the capacitor during the regenerative energy operation;
      monitor a change in battery voltage;
      adjust a minimum allowable capacitor discharge threshold value according to the change in battery voltage;
      monitor a supply voltage; and
      discharge the capacitor to provide power to the traction motor or for the other operations of the vehicle, wherein the capacitor ceases discharging when the supply voltage drops to, or falls below, the adjusted minimum allowable capacitor discharge threshold value.

12. The system according to claim 11 wherein the auxiliary motor is a hoist motor configured to raise and lower a load and wherein the regenerative energy operation comprises lowering the load.

13. The system according to claim 11 wherein the capacitor is connected to the battery in parallel.

14. The system according to claim 11 wherein, prior to the discharge of the capacitor, the controller is further configured to:
  switch the battery out of a vehicle electrical circuit in response to identifying the regenerative energy operation;
  determine a state of charge of the capacitor during the regenerative energy operation; and
  switch the battery back into the vehicle electrical circuit in response to the state of charge of the capacitor reaching or exceeding a maximum allowable capacitor charge limit voltage threshold value.

15. The system according to claim 14 wherein the controller is further configured to:
  switch the capacitor out of the vehicle electrical circuit in response to the state of charge of the capacitor reaching or exceeding the maximum allowable capacitor charge limit voltage threshold value.

16. The system according to claim 15 wherein the capacitor is switched out of the vehicle electrical circuit substantially simultaneously as the battery is switched in.

17. The system according to claim 15 wherein, prior to the discharge of the capacitor, the controller is further configured to:
  switch the capacitor back into the vehicle electrical circuit; and
  switch the battery back out of the vehicle electrical circuit.

18. The system according to claim 14 wherein the controller is further configured to:
  direct the regenerative energy to power concurrent operations of the vehicle during the regenerative energy operation.

19. The system according to claim 18 wherein, after the capacitor is switched out of the vehicle electrical circuit and prior to the discharge of the capacitor, the controller is further configured to:
  charge the battery with any regenerative energy in excess of that used to power the concurrent operations.

20. The system according to claim 14 wherein, prior to the discharge of the capacitor, the controller is further configured to:
  direct the regenerative energy away from the capacitor and toward the battery during the regenerative energy operation.

21. The energy recapture system according to claim 1 wherein the controller is further configured to:
  adjust a minimum allowable capacitor discharge threshold value according to a change in battery voltage; and
  discharge the capacitor to provide power to the vehicle, wherein the capacitor ceases discharging when the supply voltage drops to, or falls below, the adjusted minimum allowable capacitor discharge threshold value.

22. A system comprising:
  a capacitor;
  a battery connected to the capacitor in an electrical circuit;
  means for identifying a regenerative energy transfer event of a vehicle;
  means for switching the battery out of the electrical circuit in response to identifying the regenerative energy transfer event;
  means for monitoring a temperature of the capacitor during the regenerative energy transfer event, wherein the temperature of the capacitor is compared with an allowable charging temperature threshold; and
  means for switching the battery into the electrical circuit during the regenerative energy transfer event in response to the temperature of the capacitor reaching or exceeding the allowable charging temperature threshold.

23. The system according to claim 22 wherein regenerative energy associated with the regenerative energy transfer event is redirected from the capacitor to the battery in response to switching the battery into the electrical circuit.

24. The system according to claim 22 wherein the means for switching the battery into the electrical circuit comprises means for switching the battery into the electrical circuit prior to discharging the capacitor.

25. A method comprising:
  identifying a regenerative energy transfer event of a vehicle, wherein the vehicle comprises a battery connected to a capacitor in an electrical circuit;
  switching the battery out of the electrical circuit in response to identifying the regenerative energy transfer event;
  monitoring a state of charge of the capacitor during the regenerative energy transfer event, wherein the state of charge of the capacitor is compared with a capacitor charge limit; and
  switching the battery into the electrical circuit during the regenerative energy transfer event in response to the state of charge of the capacitor reaching or exceeding the capacitor charge limit.

26. The method according to claim 25 further comprising:
  monitoring a change in battery voltage;
  adjusting a minimum allowable capacitor discharge threshold value according to the change in battery voltage;
  monitoring a supply voltage; and
  discharging the capacitor to provide power to the vehicle, wherein the capacitor ceases discharging when the supply voltage drops to, or falls below, the adjusted minimum allowable capacitor discharge threshold value.

27. The method according to claim 26 wherein switching the battery into the electrical circuit during the regenerative energy transfer event comprises switching the battery into the electrical circuit prior to discharging the capacitor.

28. The method according to claim 26 further comprising:
  charging the capacitor with regenerative energy during the regenerative energy transfer event; and
  charging the battery with the regenerative energy during the regenerative energy transfer event after charging the capacitor, wherein the battery is charged prior to discharging the capacitor.

29. The method according to claim 26 wherein the minimum allowable capacitor discharge threshold value is adjusted to be approximately equal to the battery voltage.

30. The system according to claim 11 wherein the minimum allowable capacitor discharge threshold value is approximately equal to the battery voltage.

* * * * *